United States Patent
Wu et al.

(10) Patent No.: US 9,578,314 B2
(45) Date of Patent: Feb. 21, 2017

(54) IMAGE/INFORMATION DISPLAY SYSTEM AND METHOD BASED ON TEMPORAL PSYCHO-VISUAL MODULATION

(75) Inventors: Xiaolin Wu, Shanghai (CN); Guangtao Zhai, Shanghai (CN)

(73) Assignee: EYELEMENTEC INC., Nanjing (CN)

( * ) Notice: Subject to any disclaimer, the term of this patent is extended or adjusted under 35 U.S.C. 154(b) by 192 days.

(21) Appl. No.: 14/128,509

(22) PCT Filed: Jun. 21, 2012

(86) PCT No.: PCT/CN2012/077353
§ 371 (c)(1),
(2), (4) Date: Dec. 20, 2013

(87) PCT Pub. No.: WO2012/175039
PCT Pub. Date: Dec. 27, 2012

(65) Prior Publication Data
US 2014/0132744 A1    May 15, 2014

Related U.S. Application Data

(60) Provisional application No. 61/457,859, filed on Jun. 22, 2011, provisional application No. 61/457,944, filed on Jul. 14, 2011, provisional application No. 61/573,060, filed on Aug. 22, 2011, provisional application No. 61/632,564, filed on Jan. 26, 2012.

(51) Int. Cl.
*H04N 7/12*      (2006.01)
*H04N 13/04*    (2006.01)
*H04N 13/00*    (2006.01)
*G06F 3/14*      (2006.01)

(52) U.S. Cl.
CPC ............ *H04N 13/04* (2013.01); *G06F 3/1423* (2013.01); *H04N 13/0033* (2013.01); *H04N 13/0438* (2013.01); *G09G 2310/0297* (2013.01); *G09G 2370/20* (2013.01); *H04N 2013/0461* (2013.01)

(58) Field of Classification Search
CPC ...................................................... H04N 13/04
USPC .......................................................... 348/55
See application file for complete search history.

(56) References Cited

U.S. PATENT DOCUMENTS

| 2008/0111833 A1* | 5/2008 | Thorn ...................... G09G 5/00 345/690 |
| 2010/0085373 A1* | 4/2010 | Miyasaka ................ G09G 5/00 345/589 |

(Continued)

OTHER PUBLICATIONS

How to single screen can show several interactive perspectives. Emerging Technology. Jan. 12, 2012.

*Primary Examiner* — Richard Torrente
(74) *Attorney, Agent, or Firm* — CBM Patent Consulting, LLC

(57) ABSTRACT

An image/information display system and method based on temporal psychovisual modulation in the technical field of image/video processing and electro-optical display. The system includes a high speed display device and an auxiliary viewing device cooperating with each other and interacting with a human visual system. The auxiliary viewing device realizes the temporal amplitude modulation of the composition basic sequence by a method of controlling the light intensity transfer rate from the display plane of the high speed display device to the human eye.

8 Claims, 4 Drawing Sheets

(56) References Cited

U.S. PATENT DOCUMENTS

2011/0134115 A1\* 6/2011 Araki ................ H04N 13/0452
                                                    345/419
2011/0254829 A1\* 10/2011 Agevik .............. H04N 13/0402
                                                    345/213

\* cited by examiner

IMAGE/INFORMATION DISPLAY SYSTEM AND METHOD BASED ON TEMPORAL PSYCHO-VISUAL MODULATION

This application is the U.S. national phase of International Application No. PCT/CN2012/077353 Filed on 21 Jun. 2012 which designated the U.S. and claims priority to US Application Nos. 61/457,859, 61/457,944, 61/573,060, 61/632,564 filed on 22 Jun. 2011, 14 Jul. 2011, 22 Aug. 2011 and 26 Jan. 2012 respectively, the entire contents of each of which are hereby incorporated by reference.

TECHNICAL FIELD

This invention is a method and system for information display involving the fields of image/video signal processing and optoelectronic displays. More specifically, it is a multiview information display method and system using a high refresh rate display and viewing devices that carry out a computational information display process called Temporal Psychovisual Modulation (TPVM).

BACKGROUND ART

The human visual system (HVS) cannot resolve temporally rapidly changing optical signals beyond flicker fusion frequency (around 60 Hz for most viewers and under most conditions). But modern optoelectronic displays can operate at much higher refresh rates, e.g. 120 Hz, 240 Hz and beyond. For example, the new light modulators such as the deformable mirror devices and grating light valve devices can lead to very high refresh rate (up to 88 k Hz) and spatial resolution for digital projectors; even inexpensive mainstream liquid crystal (LC) displays now offer 120 Hz or 240 Hz refresh rate, as demanded by emerging applications of stereoscopy.

A high-speed optoelectronic display device can broadcast in visible spectrum a far greater amount of visual stimuli than any viewer can possibly assimilate. Thus, a single display has extra capacity, i.e., psychovisual redundancy, to generate multiple visual percepts for a plurality of users. A straightforward way of exploiting psychovisual redundancy of high-speed displays is time multiplexing. Sony's dual-view technology presents two game participants their respective views on the same screen but in disjoint time slots (US2010/0177172A1, publication date 2010-07-15, "Stereoscopic screen sharing method and apparatus"; US2010/0177174, publication date 2010-07-15, "3D shutter glasses with mode switching based on orientation to display device"). Kulik et al. proposed a 360 Hz display system to generate six stereoscopic views based on time multiplexing and polarization (A. Kulik, A. Kunert, S. Beck, R. Reichel, R. Blach, A. Zink, and B. F. Yoehlich, "A stereoscopic six-user display for co-located collaboration in shared virtual environments", ACM Transactions on Graphics, vol. 30, no. 6, 2011). But time multiplexing is a very inefficient approach of utilizing psychovisual redundancy of a high-speed display, because it completely ignores statistical redundancy among the output images. As a result, the number of different views K can only increase linearly in the display speed; moreover, the light influx of each view also decreases linearly in K. These constraints greatly limit the number of concurrent views that can be produced by time multiplexing. Another major drawback of multiplexing type of multiview display methods is that they cannot generate meaningful images for viewers who do not use any auxiliary viewing device.

DISCLOSURE OF THE INVENTION

This invention is a fundamental departure from time multiplexing; it overcomes the above mentioned shortcomings of time multiplexing. The key innovation is to fully exploit both psychovisual redundancy of the high-speed display devices and statistical redundancy of visual signals by temporal amplitude modulation of two-dimensional signals in visible spectrum. In the invented multiuser display method and system, a high-speed display or projector sequentially emits a set of so-called atom frames, which are a two-dimensional grid of pixels. Unlike in time multiplexing, these atom frames are not necessarily completely formed images but rather constituent parts of a group of images to be displayed concurrently with the same display device. These atom frames are amplitude modulated by display-synchronized viewing devices, which effectively apply different weights to individual atom frames. Different users perceive their intended images all on the same physical display plane, as the results of their individual HVS's fusing appropriately weighed consecutive atom frames. Not only this invention can generate a large number of concurrent views required individually by a plurality of users with a single display device, but also it can prevent the problem of low light influx for each of the concurrent views, which are not achievable by time multiplexing-based multiuser display methods.

The invented method and system of information display comprise, as depicted in FIG. 1, a high-speed display device and accompanied viewing device(s) that interact(s) with the display device and the human visual system. The said viewing device(s) is(are) capable of adjusting, in a continuous range, the transmittance rate of light from the display plane of the said display device to eye(s) of the viewer who uses the viewing device, thus performing temporal amplitude modulation of the atom frames emitted by the display device.

When the said multiview display system serves a plurality of users, their viewing devices can independently adjust the amount of light attenuation and vary the light transmittance rate from the display plane to users' eyes in the range between 0 and 1; namely, anywhere in between complete blockage to complete passage of light. Through synchronization with the display device that emits atom frames, each user's independently adjustable light attenuation viewing device carries out the temporal amplitude modulation of atom frames that is required to form the image for the user in his/her own human visual system. Because the same sequence of atom frames can be amplitude modulated differently by different users' viewing devices, a single high-speed display device can concurrently exhibit a plurality of images without interference. The above described methodology and system represent a new paradigm of computational information display, called temporal psychovisual modulation (TPVM). The display-synchronized light attenuation viewing devices are referred to as TPVM viewing devices in the sequel. The synchronization between the high-speed display device and the TPVM viewing devices can be achieved readily by any one of many low-bandwidth short-range communication methods, wired or wireless. The method of computing temporal amplitude modulation patterns for different users will be described in detail shortly in this document.

One or more users can use their TPVM viewing devices to carry out a particular temporal light amplitude modulation so that he can see private/secret information or image on a display plane that are invisible or illegible to those who do not use the light-modulation viewing device. Similarly, at the same time when the TPVM display system generates different concurrent images to be perceived by users who use their TPVM viewing devices, it can also display yet another meaningful image to those who do not use any TPVM viewing device at all.

By a slight generalization, the display-synchronized TPVM viewing devices can perform different light amplitude modulations on different groups of pixels or on different pixels.

Also, different light amplitude modulations can be applied to the left and right eyes in case the TPVM viewing device has separate lens for the two eyes, like active LC glasses.

Next presented are the details of the TPVM computational information display method. In the following descriptions, it is assumed that the brightness of the display device is linear in pixel value. For display devices not satisfying the said linearity assumption, a remapping of pixel values to brightness levels, such as gamma correction, should be carried out to ensure the validity of the methods to be described hereafter. Let $x_1, x_2, \ldots, x_M$ be the sequence of atom frames emitted by the high-speed display device of the system, where M is a positive integer. These M atom frames are amplitude modulated to form K target images $y_1, y_2, \ldots, y_K$, where K is a positive integer. Target image $y_k$, $1 \leq k \leq K$, is the result of modulating atom frames $x_1, x_2, \ldots, x_M$ with modulation weighting vector $w_k = (w_{k1}, w_{k2}, \ldots, w_{kM})$ namely, $y_k = w_{k1}x_1 + w_{k1}x_2 + \ldots + w_{km}x_M$, where w is the light transmittance rate of atom frame $x_M$, $1 \leq m \leq M$, to generate target image $y_k$. The K modulation weighting vectors need to be computed and transmitted to the corresponding K display-synchronized TPVM viewing devices, one for each target image.

The K target images $y_1, y_2, \ldots, y_K$ constitute an N×K matrix Y with column k being image $y_k$ of N pixels; the M atom frames $x_1, x_2, \ldots, x_M$ constitute an N×M matrix X with column k being atom frame $x_k$ of N pixels; The task of the TPVM display system is to solve the problem of signal decomposition Y=XW, where W is an M×K modulation matrix whose columns are the K weighting vectors $w_1, w_2, \ldots, w_K$. In other words, computing appropriate M atom frames and corresponding K modulation vectors to concurrently display K given target images requires the factorization of matrix Y (the K target images) into the product of matrix X (the M atom frames) and matrix W (the corresponding K modulation vectors). Since the display device cannot emit negative light energy and TPVM viewing devices cannot implement negative light transmittance rate, the signal decomposition Y=XW has to be a non-negative matrix factorization (NMF). Moreover, the elements of matrix X need to be set in the normalized interval [0,1] in order to account for the fact that the dynamic range of the display device is finite. Considering the current state of the art that light modulation devices, such as active LC glasses, can only perform light attenuation not magnification, the elements of matrix W should be constrained within the interval[0,1]. Therefore, given K target images, the TPVM multiview display system solves the following NMF problem $$\min_{X,W} \|sY - XW\|_F \quad (1)$$

$$\text{subject to } 0 \leq W \leq 1, 0 \leq X \leq 1$$

to obtain the M atom frames in X to drive the high-speed display device, and obtain the K modulation weighting vectors in matrix W that are communicated to and drive the display-synchronized TPVM viewing devices, with the objective of minimizing the errors in the reconstructed K target images. The scaling factor s, $1 \leq s \leq M$, is optional to ensure adequate intensities of the concurrently displayed images.

Should more sophisticated light modulation devices become available in the future that can perform light magnification, the upper bound on W can be accordingly relaxed within the scope of this invention.

The above described method is an ideal but only one of many possible methods of computing the atom frames and modulations weights of the TPVM multiview display system.

Other more practical, approximate methods can be derived by skilled persons in the field but within the scope and principle of this invention, and hence should be considered merely variants of the above described method and should fall within the scope of the invention.

The TPVM multiview display system transmits the modulation weighting vectors $w_1, w_2, \ldots, w_K$ computed as described above, possibly together with frame synchronization markers, to users' display-synchronized TPVM viewing devices.

Users can choose which of the K target images to perceive by receiving and applying to his/her TPVM viewing device the corresponding amplitude modulation weighting vector; the image perceived through a viewing device that performs amplitude modulation according to $w_k = (w_{k1}, w_{k2}, \ldots, w_{kM})$ is target image $y_k = w_{k1}x_1 + w_{k1}x_2 + \ldots + w_{km}x_M$, $1 \leq k \leq K$, which is a linear combination of the M atom frames computed as described above.

Physically, $w_{k1}, w_{k2}, \ldots, w_{kM}$ are frame-synchronized signals by which the TPVM viewing device controls the transmittance rates of the individual atom frame.

In the TPVM multiuser display system, a viewing device of separate lens for the left and right eyes, such as a pair of active LC glasses, can apply different amplitude modulation vectors to the two lenses and generate different left-eye and right-eye images for the user, if so desired.

Preprocessing is an effective approach to greatly reduce the complexity of the TPVM multiview display system. In practice, the atom frames and the amplitude modulation weighting vectors corresponding to a given set of target images can be pre-computed and stored, so that they can be later fetched to respectively drive the display device and the TPVM viewing devices in real-time sessions.

The TPVM multiview display system of this invention can work in conjunction with eye-tracking or/and location tracking devices for one or several users. Based on the present locations of users' eyes or bodies generated by these tracking devices, the TPVM multiview display system computes and updates target images according to users' eye positions and viewing angles. The resulting target images are then decomposed into a set of atom frames and the corresponding amplitude modulation vectors by non-negative matrix factorization; the atom frames and modulation vectors are then used to respectively drive the display device and the display-synchronized TPVM viewing devices as described above.

Among all concurrent views generated by the TPVM multiview display system, there is a particular view, called normal view. The normal view is the result of the human visual system fusing all atom frames without any attenuation. In other words, the normal view is our daily visual experience without tampering the lights from the display, which is the image $y_0 = x_1 + x_2 + \ldots + x_M$, where M is the number of atom frames. In contrast, other views perceived through unequal attenuations of the atom frames are called shale views, namely images $y_k$, $1 \leq k \leq K$ in the notation above.

The TPVM multiview display system can choose the atom frames $x_1, x_2, \ldots, x_M$ and the amplitude weighting vectors $w_1, w_2, \ldots, w_K$ using the methods to be detailed below, so that the normal view $y_0 = x_1 + x_2 + \ldots + x_M$ is semantically meaningful or/and visually pleasing for those using no TPVM viewing devices; at the same time, others using TPVM viewing devices perceive shale views individually required by them.

One of the methods to concurrently display a given normal view $y_0$ and K given shale views $\{y_k\} 1 \leq k \leq K$, is to solve the following equation with acceptable accuracy $$(y_0, y_1, \ldots, y_K) \approx \frac{1}{C(M)} (x_1, x_2, \ldots, x_M) \begin{pmatrix} 1 & w_{11} & \ldots & w_{1K} \\ 1 & w_{21} & \ldots & w_{2K} \\ \vdots & \vdots & \ddots & \vdots \\ 1 & w_{M1} & \ldots & w_{MK} \end{pmatrix} \quad (2)$$

where C(M) is a constant depending on M used to adjust the brightness of the shale views and the normal view, and obtain the atom frames $x_1, x_2, \ldots, x_M$ and amplitude modulation vectors $w_k = (w_{k1}, w_{k2}, \ldots, w_{kM})$ $1 \leq k \leq K$, which are required to generate the normal view $y_0$ and the K shale views $y_k$, $1 \leq k \leq K$. The capability to concurrently exhibit one useful or/and pleasing normal view to viewers who do not use any TPVM viewing device and one or many shale views required by users who use TPVM viewing devices, all on a single high-speed display device, is a unique and landmark property of this invention. This property opens up many new applications that are not possible with the existing information display technologies.

BEST MODE FOR CARRYING OUT THE INVENTION

Embodiment 1: Multiuser Virtual Reality and Augmented Reality

Figure 1:
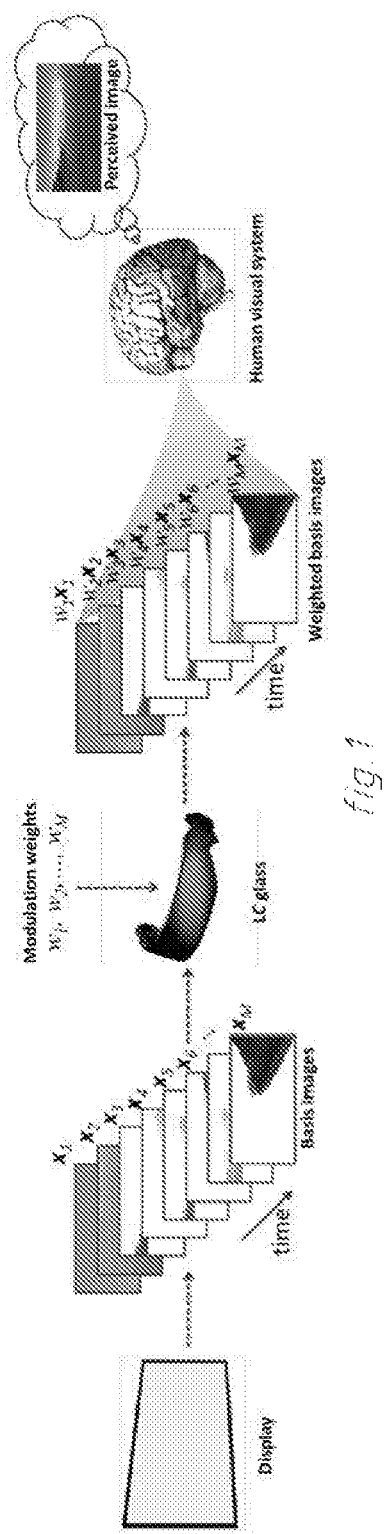
FIG. 1 illustrates the principle of computational information display of the TPVM invention. A high refresh rate display device broadcasts a sequence of atom frames; these atom frames, after being amplitude modulated by the display-synchronized active liquid crystal glasses, are fused and perceived by the human visual system as the target image.
Figure 2:
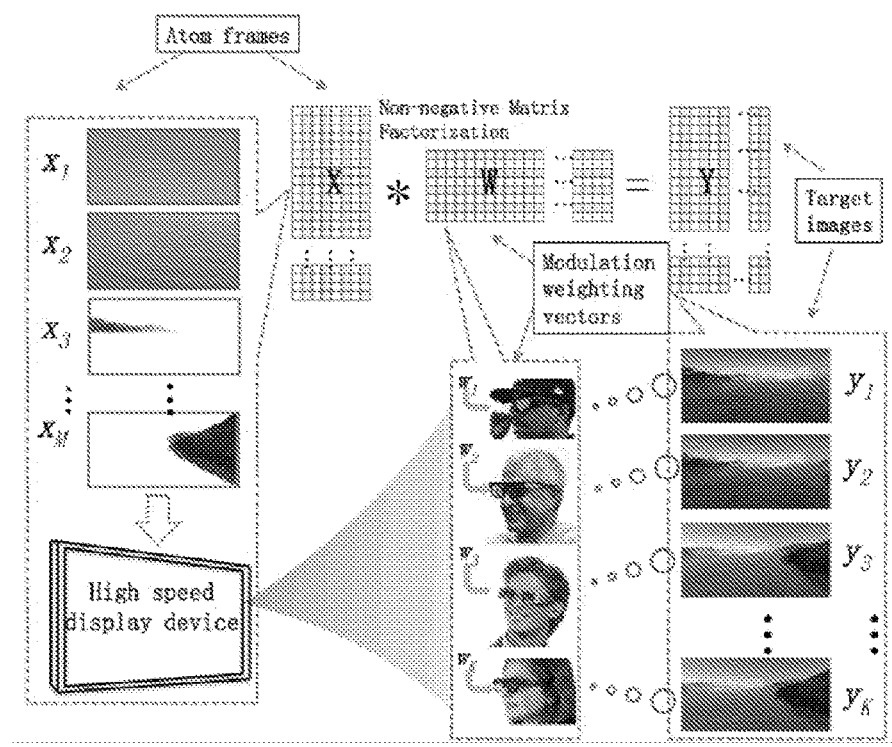
FIG. 2 is a schematic illustration of the TPVM multiview display system that exhibits to a plurality of users individually required images concurrently on the same display plane, as detailed in embodiment 1.

As illustrated in FIG. 2, the TPVM multiview display system can exhibit to a plurality of users individually required images concurrently on the same display plane. The high-speed display device broadcasts to all users a common set of atom frames. Through synchronization with the above said display device, each user's independently adjustable light-attenuation viewing device carries out an appropriate temporal amplitude modulation of the atom frames to form the image for the user in his/her own human visual system.

The unique ability of the TPVM multiview display system to generate different concurrent interference-free views on the same physical display plane adds a valuable social dimension to applications of virtual reality (VR), augmented reality (AR) and visualization. This invention can provide, in conjunction with eye trackers and/or motion sensors, a plurality of users with their own perspective-correct views; for instance, in a virtual stadium, users can watch the same ball game in their own vantage points while enjoying each other's accompany. In this setting, exchanges on whether a ball crosses the goal line, or the alike, become more interesting and engaging.

This invention can provide an intellectually stimulating and productive platform for collaborative investigation and learning in VR or AR. For example, when a group of physicians meet face to face to visually examine a difficult case using a TPVM multiview display system, everyone can independently explore the 3D anatomy of the patient in his/her own perspective while pointing to the object of interest on screen and exchanging thoughts with colleagues. Such a group experience of exploring a virtual environment in physical co-presence is either impossible or unnatural with current display devices of VR and AR, because head mounted displays hinder face-to-face communication.

Figure 3:
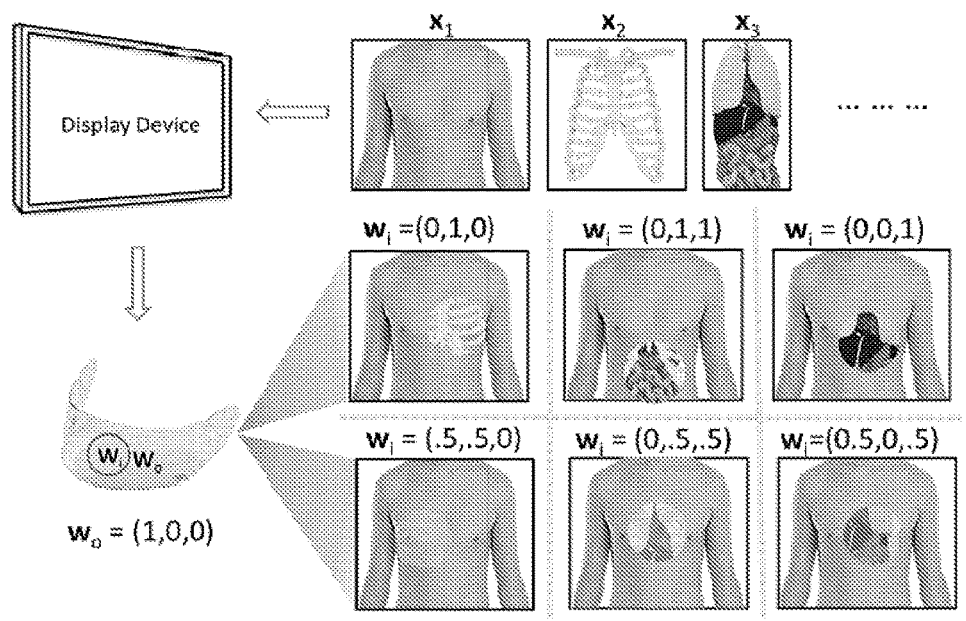
FIG. 3 illustrates a way a display-synchronized TPVM viewing device, such as those made of active LC class, carries out different amplitude modulations in different parts of the atom frames by spatially varying the amount of light attenuation, when driven by corresponding spatially varying modulation weights. Individual users can have different visual experiences independent of others' from the same display plane, via their own TPVM viewing devices that perform different spatially varying amplitude modulations of the same set of atom frames. The depicted example is that the TPVM multiview display system allows multiple users to independently explore a 3D medical data set via their individual TPVM viewing devices of spatially varying modulation weights.

Moreover, these personal AR/VR display devices like Google Glass do not allow multiple users to work with the same display medium. In the TPVM multiview display system, a display-synchronized viewing device does not have to perform the same amplitude modulation everywhere in an atom frame. As shown in FIG. 3, a TPVM viewing device, such as a visor made of active LC class, can carry out different amplitude modulations in different parts of the atom frames by spatially varying the amount of light attenuation, when being driven by corresponding spatially varying modulation weights. By spatially varying amplitude modulation weights of the display-synchronized TPVM viewing device, the TPVM multiview display system can create many new interesting multi-user visual experiences. FIG. 3 shows such an example for 3D medical visualization. Specifically, multiple layers of registered human anatomy images are mapped to atom frames: atom frame 1 is the outer human body; atom frame 2 is the skeleton; atom frame 3 is the inner organs. These atom frames are cyclically exhibited at high speed to users, each of whom watches the display through his/her own display-synchronized active LC visor (an embodiment of TPVM viewing device in this case). The area of the display-synchronized LC visor is partitioned into inner and outer parts. In the inner part the M atom frames are amplitude modulated according to modulation weighting vector $w_i=(w_{i1}, w_{i2}, \ldots, w_{iK}) \in [0,1]^K$; in the outer part the M atom frames are amplitude modulated according to modulation weighting vector $w_o=(w_{o1}, w_{o2}, \ldots, w_{oK}) \in [0,1]^K$.

By choosing different modulation weighting vectors $w_i$ and $w_o$ of his/her TPVM visor, a user can experience different desired see-through visual effects of the human body. For instance, by setting $w_i=(0,0,1)$ and $w_o=(1,0,0)$, a user sees a selected internal organ in alignment with the exterior of the human body. It is also straightforward to perform Alpha blending of anatomy layers by adjusting the modulation weights of the display-synchronized LC visor. Similarly, spatially varying TPVM modulation weighting vectors can be used to visualize a raw 3D volume data set in various ways. For example, 2D sections of a 3D volume, denoted by $x_1, x_2, \ldots, x_M$, are cyclically displayed at high speed as atom frames. The display-synchronized LC visor changes the amount of light attenuation in a concentric pattern under the control of the corresponding spatially varying modulation weighting vector. In this way, the TPVM multiview display system can present to multiple users different funnel-shaped "dig-in" views into the 3D volume (mosaic of depth layers) concurrently on the same physical display plane.

When being used in multiuser VR/AR applications, the TPVM multiview display system has a distinct advantage over user-wearable display devices such as head-amounted displays and Google Glass in that it moves heavy computations of image formation from personal devices and distribute them to a powerful server that solves the underlying TPVM problem of non-negative matrix factorization, to a high-speed display, and to the user's own HVS. As a result, the terminal user AR/VR device becomes much simpler, lighter, far less expensive and energy efficient than existing ones. Moreover, the TPVM multiview display paradigm can greatly reduce the computation power and video memory bandwidth requirements of real-time VR/AR applications, because a small number of atom frames, which can be pre-computed for a given virtual environment, can synthesize a large range of different views through appropriate amplitude modulations of the pre-computed atom frames that are performed by users' viewing devices. The communication bandwidth for transmitting TPVM modulation vectors to display-synchronized viewing devices is negligibly small in contrast to the bandwidth required to transmit images/videos to end user devices.

Embodiment 2: Backward-Compatible Stereoscopic Display

Figure 6:
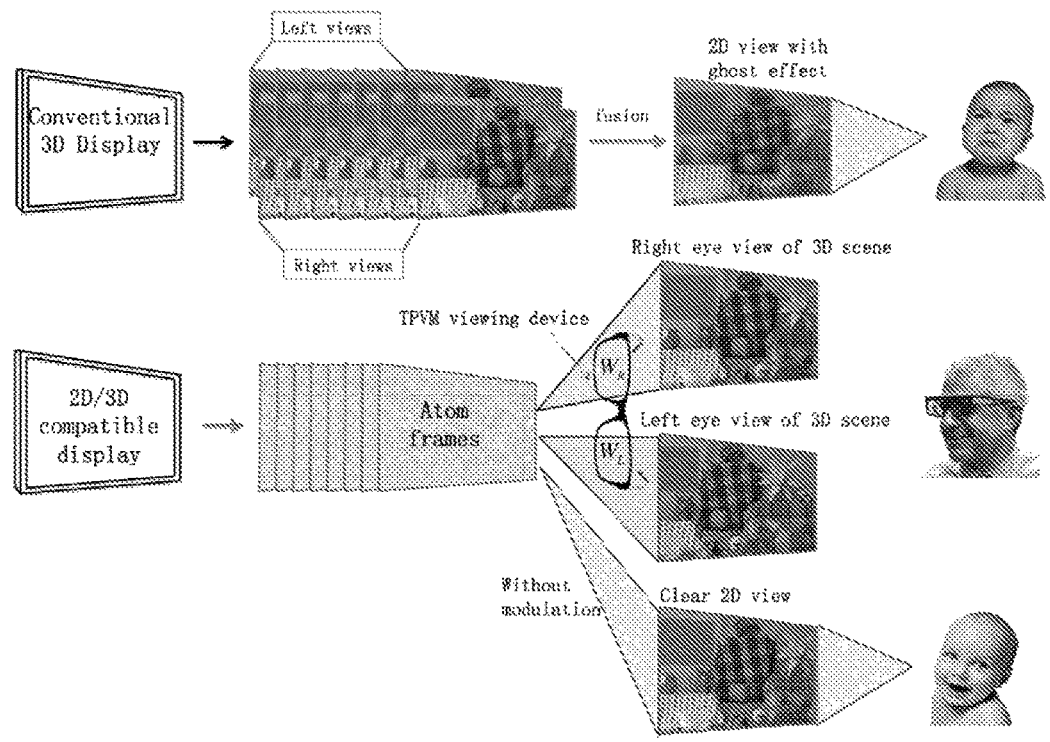
FIG. 6 illustrates the method and system of backward-compatible stereoscopic display by a joint construction of a 2D normal view for viewers using no 3D glasses and two shale views, one per eye, for viewers using 3D glasses, as detailed in embodiment 2.

As shown in FIG. 6 and as detailed in the description of the invention, by properly choosing atom frames $x_1, x_2, \ldots, x_M$ and the amplitude weighting vectors $w_1, w_2, \ldots, w_K$, the TPVM multiview display system can simultaneously exhibit one or many views to one or many user(s) who use display-synchronized viewing device(s) and a normal view $y_0=x_1+x_2+\ldots+x_M$ that is meant for those who use no TPVM viewing devices, all on the same physical display plane. The utility of the above said TPVM functionality can be exemplified by another embodiment of this invention: backward-compatible stereoscopic display system. Here the backward compatibility of a stereoscopic display system means that on the same physical display medium a three-dimensional image and a two-dimensional image of a scene can be exhibited concurrently; viewers wearing stereoscopic glasses perceive the three-dimensional image, while viewers wearing no stereoscopic glasses perceive the two-dimensional image. This invention can realize a backward-compatible stereoscopic display system, by creating $K=2$ with shale views $y_L$ and $y_R$, which are the left-eye and right-eye images of a stereoscopic scene respectively, plus a normal view $y_0$ that is a two-dimensional representation of the same stereoscopic scene. Without loss of generality, an exemplary backward-compatible stereoscopic display method and system are described below.

Given a stereoscopic image $(y_L, y_R)$ and an accompany two-dimensional image $y_0$, M atom frames $x_1, x_2, \ldots, x_M$ and two amplitude modulation weighting vectors $w_L=(w_{L1}, w_{L2}, \ldots w_{LM})$ and $w_R=(w_{R1}, w_{R2}, \ldots w_{RM})$ are jointly computed via the following non-negative matrix factorization:

$$(y_0, y_L, y_R) \approx \frac{1}{C(M)} (x_1, x_2, \ldots, x_M) \begin{pmatrix} 1 & w_{L1} & \ldots & w_{R1} \\ 1 & w_{L2} & \ldots & w_{R2} \\ \vdots & \vdots & \ddots & \vdots \\ 1 & w_{LM} & \ldots & w_{RM} \end{pmatrix} \quad (3)$$

where $C(M)$ is a constant dependent on M. The left lens of the stereoscopic glasses amplitude modulates the resulting M atom frames $x_1, x_2, \ldots, x_M$ with modulation weighting vector $w_L=(w_{L1}, w_{L2}, \ldots w_{LM})$; the right lens of the stereoscopic glasses amplitude modulates the same set of atom frames with modulation weighting vector $w_R=(w_{R1}, w_{R2}, \ldots w_{RM})$. Therefore, viewers wearing the said TPVM stereoscopic glasses perceive the three-dimensional image $(y_L, y_R)$ as the results of the modulations. On the same display medium and at the same time, viewers wearing no stereoscopic glasses perceive the two-dimensional image $y_0$, which is the result of directly fusing the atom frames $x_1, x_2, \ldots, x_M$ by the human visual system.

Other computationally more efficient implementations of the TPVM-based backward-compatible stereoscopic display method and system are also possible. For example, the concurrent 3D and 2D views can be generated by finding the solutions of the following linear least-square problem $$\min_{x_1, x_2, \ldots, x_M, \alpha} \{\|x_1 - y_L\| + \quad (4)$$

$$\|x_{M/2} - y_R\| + \lambda \cdot \|\alpha y_0 - x_1 - x_2 - \ldots - x_M\|\}$$

$$\text{subject to } 0 \le x_1, x_2, \ldots, x_M \le 1; 1 < \alpha \le M$$

where the Lagrangian multiplier 2 is used to balance the visual qualities of the resulting 2D and 3D views; coefficient $\alpha$ determines overall intensity of the 2D image and it is adjusted in the optimization process to eliminate or suppress artifacts of the 2D image.

Yet an even simpler, real-time approximate method of choosing the atom frames for the backward-compatible stereoscopic display is to directly set the left-eye image $y_L$ and the right-eye image $y_R$ to two of the atom frames, say $x_i$ and $x_j$, $1 \le i, j \le M$, M being the number of atom frames, and make the 2D image $y_0$ be either the left-eye image $y_L$ or the right-eye image $y_R$. The other atom frames $x_t$, $t \ne i,j$, are chosen some way such that $x_1+x_2+\ldots+x_M \approx y_0$. For instance, for M=4, a possible method is $$x_1=y_L, x_2=\alpha y_0-y_L, x_3=y_R, x_4=\alpha y_0-y_R \quad (5)$$

the resulting atom frames $x_1, x_2, x_3, x_4$ are displayed cyclically at high speed and are amplitude modulated by the left and right active LC eye glasses according to modulation weighting vectors $w_L=(1,0,0,0)$ and $w_R=(0,0,1,0)$, respectively. This process generates a stereoscopic view for all users who wear the above said 3D glasses. At the same time and on the same TPVM display medium, viewers without 3D glasses perceive a 2D view $y_0=x_1+x_2+x_3+x_4$ of the same scene.

In the above described TPVM-based backward-compatible stereoscopic display system, the choice of the 2D image $y_0$ to be synthesized by TPVM for viewers wearing no 3D glasses may vary in time; $y_0$ can be made to switch from the left-eye view $y_L$ to the right-eye view $y_R$ or to any other in-between view, back and forth. This 2D view $y_0$ should be chosen to minimize the overall amount of perceptual artifacts. In order to prevent jittering in the synthesized 2D video, the switch of the 2D views should coincide in time with scene changes in the video.

While the foregoing written description of the TPVM-based backwards-compatible stereoscopic display/projection method and system enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Embodiment 3: Security Display, Multilingual Display and the Alike

In the TPVM multiview display method and system, the normal view $y_0$ formed without amplitude modulation of atom frames and a shale view $y_k$ formed with amplitude modulation of atom frames can be made visually and semantically very different.

Figure 4:
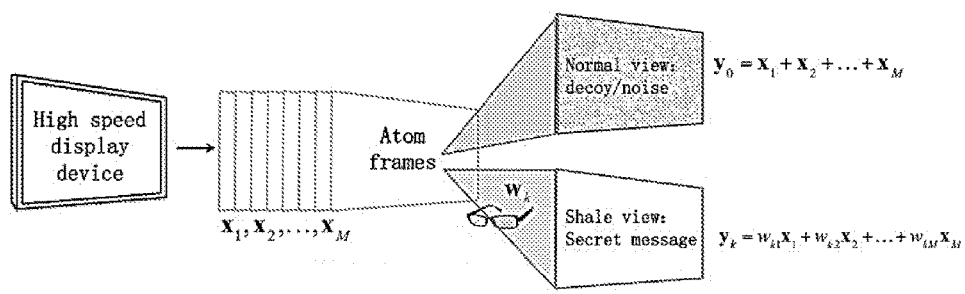
FIG. 4 illustrates the method and system of security display based on the bifurcation between the normal view and shale view, as detailed in embodiment 3.

By deliberately making the normal view $y_0$ unrelated to the shale view $y_k$, the TPVM display method and system can use the normal view $y_0$ as a camouflage of a secret image that is the shale view $y_k$. Like the cover text in steganography, the normal view $y_0$ misleads unaided eyes whereas the shale view $y_k$ carries secret messages that are only readable through a display-synchronized TPVM viewing device, which can be encrypted through a time varying modulation weighting vectors. The security display method uses a subset of atom frames to generate the secret message and it uses another subset of atom frames to generate the camouflage or interference visual signals. When all the atom frames are displayed at high speed, only authorized user(s) who are equipped with the above said TPVM viewing device(s) can read the secret message; all other viewers will see a decoy image or an inference image (e.g., white noises). The above described TPVM-based security display method allows a user to work with confidential information on a personal device in public areas with no worry of being eavesread or peeped as depicted in FIG. 4. This invention offers much stronger protection than optical privacy film of the 3M company that can only block certain viewing angles and cannot prevent eavesreading or peeping from behind. If implemented on a touch screen of high refresh rate, this invention can realize a privacy keypad that only the user can operate via a special viewport or glasses. The TPVM-based privacy keypads can be used on automatic teller machines, electronic payment machines, combination locks and etc.

There are many embodiments of the above described TPVM-based security display method and system. What is described below is only one possible embodiment. Suppose that a display device can emit M atom frames without causing objectionable flickering. Given a secret image $y_1$ for authorized users who use TPVM viewing devices and a cover (decoy) image $y_0$ intended for unassisted eyes, the perceptual bifurcation effect for the purpose of security/privacy display can be achieved by computing the M atom frames $x_1, x_2, \ldots, x_M$ and the amplitude modulation vector $w=(w_1, w_2, \ldots, w_M)$ to satisfy the following equation sufficiently well $$(y_0, y_1) \approx \frac{1}{C(M)}(x_1, x_2, \ldots, x_M)\begin{pmatrix} 1 & w_1 \\ 1 & w_2 \\ \vdots & \vdots \\ 1 & w_M \end{pmatrix} \quad (6)$$

where $C(M)$ is a function of M. The resulting M atom frames $x_1, x_2, \ldots, x_M$ are displayed cyclically at high speed, and they generate cover image $y_0$ for those without using matched TPVM viewing devices and at the same time they generate secret image $y_1$ for the authorized user(s) who is equipped with a matched, possibly encrypted, viewing device. The TPVM viewing device is driven by the modulation vector $w=(w_1, w_2, \ldots, w_M)$ while being in synchronization with the TPVM security display.

More cost-effective embodiments of the TPVM-based perceptual bifurcation method exist. For example, a 120 Hz display can generate cover image y0 and flicker-free secret image $y_1$ simultaneously using M=2 atom frames $x_1, x_2$. The best legibility of the secret message, when being read through the TPVM viewing device, requires $x_1=y_1$, or equivalently the modulation vector $w=(w_1, w_2)=(1,0)$. With $x_1$ and w given, the TPVM-based perceptual bifurcation method chooses the remaining atom frame $x_2$ such that the resulting cover image $y_0=x_1+x_2$ can best camouflage secret image $y_1$. The simplest way is to make the normal view $y_0$ a random noise image n by setting $x_2=n-x_1$.

Figure 5:
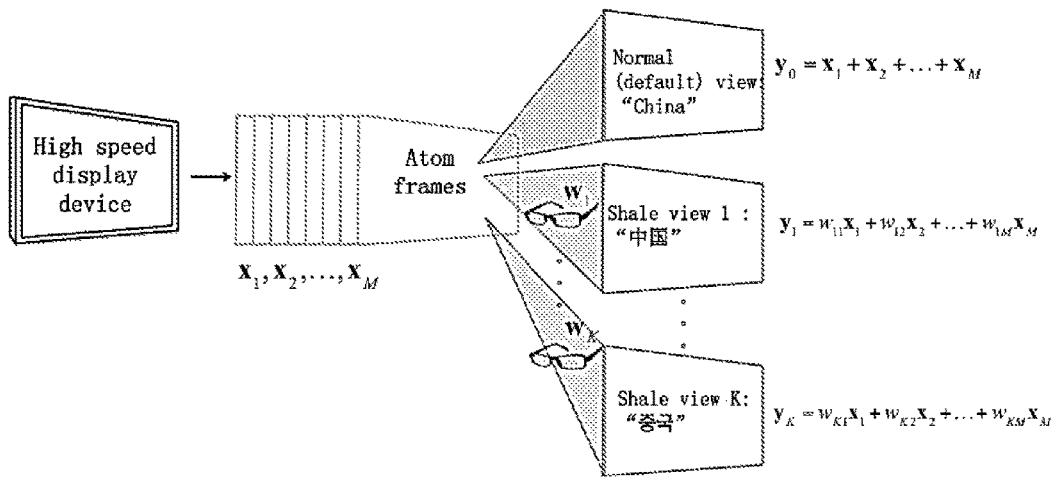
FIG. 5 illustrates the method and system of multilingual presentations of content on the same display plane, as detailed in embodiment 3.

Within the scope of this invention there is another class of applications, in which the normal view $y_0$ is not meant to conceal as in security display applications but rather to be a default view for majority or casual viewers; on the other hand, one or multiple shale views $y_k$, $1 \le k \le K$, K being a positive integer, are for some user(s) of special needs who have to share the physical display medium with others. For example, often a public speaker (e.g., teacher, entertainer, politician, etc.) desires to follow but without appearing to read notes during his/her slides presentation. This invention allows private notes to be projected onto the screen that are transparent to the audience but visible to the speaker only. In this case, the normal (default) view is the visual intended for the audience, whereas the shale view, which is an annotated normal view, can be seen by the presenter via a TPVM viewing device (e.g., active LC modulation classes). Similarly, the TPVM display method and system can support concurrent multilingual visual presentations on the same physical display medium, which is a visual equivalent to the oral form of simultaneous interpretation. In this case, as illustrated in FIG. 5, the normal (default) view displays the contents in an international language, say English, which can be read without using any TPVM viewing device; at the same time, the K shale views, $y_k$, $1 \le k \le K$, display the same contents but in other languages (e.g., Chinese, French, Japanese, Korean, etc.), which can be read using corresponding TPVM viewing devices.

This invention can also be used to build novel multiuser display systems for computer or electronic gaming. For example, two game participants can play against each other on the game console using their own TPVM viewing devices (e.g., active LC modulation glasses); player 1 receives visual percept $y_1$ meant for this player but not the visual percept $y_2$ meant for player 2, and vice versa, although they both share the same physical display medium. At the same time, all observers of the game can have visual percept $y_0$ that is meaningful and interesting for them rather than a cluttered, confusing superimposition of $y_1$ and $y_2$.

What is claimed is:

1. An image/information display system based on Temporal Psychovisual Modulation (TPVM), comprising:
   a high-speed display device that sequentially emits a sequence of atom frames, and
   accompanied TPVM viewing device(s) which interact(s) with the display device and a human visual system; wherein,
   the TPVM viewing device(s) is(are) capable of adjusting the transmittance rate of light from the display plane of the display device to the eye(s) of the viewer who uses the TPVM viewing device, thus performing amplitude modulation of the temporal sequence of atom frames displayed by said high-speed display device, the transmittance rate of light is continuously adjustable between complete blockage (0) and complete passage (1); wherein the TPVM viewing device is a light adjustment device, which synchronizes with the high-speed display device with wire or wirelessly and receives modulation weighting vector as a control signal that adjusting the transmittance rate of light between the display device and the eye(s) of the viewer, which results in different individual viewers with the TPVM viewing device see different perceived images from a same set of atom frames;
   moreover, said temporal sequence of atom frames, if not being modulated, is directly fused by the human visual system into a clear, meaningful image.

2. The system as claimed in claim 1 wherein a plurality of users use their TPVM viewing devices to perform amplitude modulations of the temporal sequence of atom frames displayed by the high-speed display device individually so that they perceive different target images, called shale views; the shale views are in general different from the so-called normal view perceived by those who do not use TPVM viewing devices and thus see the result of direct fusion of all atom frames.

3. The system as claimed in claim 1 wherein the TPVM viewing device(s) have the option of performing different temporal amplitude modulations on different groups of pixels or on different pixels of atom frames independently, allowing spatially varying amplitude modulations.

4. The system as claimed in claim 1, wherein the TPVM viewing device performs amplitude modulations of the temporal sequence of atom frames for the left and right eye individually.

5. The system as claimed in claim 1 or claim 2 wherein the temporal sequence of atom frames is modulated independently according to two amplitude modulation vectors to generate two images of a stereoscopic pair for viewer(s) with TPVM viewing device, and the above sequence of atom frames is so chosen that it can be directly fused by the human visual system into a clear two-dimensional image for viewer(s) without the TPVM viewing device.

6. The system as claimed in claim 1 or claim 2 wherein the temporal sequence of atom frames is modulated according to an amplitude modulation vector to generate an image containing secret message(s) that is visible to authorized viewer(s) with the TPVM viewing device, and the sequence of atom frames is so chosen that it can be directly fused by the human visual system into another image without secret message(s) for viewers without the TPVM viewing devices.

7. The system as claimed in claim 1 further comprising eye-tracking or/and location tracking device(s) coupled to the TPVM viewing device(s), and the tracking device(s) communicate and forwarding real-time information of the viewers' eye or/and location to the said high-speed display device, thus enables the display device adjusting the sequence(s) of atom frames and its respective modulation weighting according to each user's view point and angle.

8. The system as claimed in claim 1 wherein the temporal sequence of atom frames and the amplitude modulation weighting vectors that are required to generate a given set of target images are computed and stored in advance for later use, thus reducing the computational complexity of TPVM.

* * * * *